United States Patent
Shin et al.

(10) Patent No.: US 8,969,646 B2
(45) Date of Patent: Mar. 3, 2015

(54) CERAMIC INGOT OF SPENT FILTER HAVING TRAPPED RADIOACTIVE CESIUM AND METHOD OF PREPARING THE SAME

(71) Applicants: Korea Atomic Energy Research Institute, Daejeon (KR); Korea Hydro & Nuclear Power Co., Ltd., Seoul (KR)

(72) Inventors: Jin-Myeong Shin, Daejeon (KR); Jae Hwan Yang, Daejeon (KR); Jang Jin Park, Daejeon (KR); Youngja Kim, Daejeon (KR); Geun-Il Park, Daejeon (KR)

(73) Assignees: Korea Atomic Energy Research Institute, Daejeon (KR); Korea Hydro & Nuclear Power Co., Ltd., Gyeongju (KR)

( * ) Notice: Subject to any disclaimer, the term of this patent is extended or adjusted under 35 U.S.C. 154(b) by 291 days.

(21) Appl. No.: 14/019,056

(22) Filed: Sep. 5, 2013

(65) Prior Publication Data

US 2014/0114112 A1     Apr. 24, 2014

(30) Foreign Application Priority Data

Oct. 24, 2012   (KR) .......................... 10-2012-0118711

(51) Int. Cl.
| | | |
|---|---|---|
| G21F 9/20 | (2006.01) | |
| G21F 9/30 | (2006.01) | |
| C04B 35/653 | (2006.01) | |
| C04B 33/132 | (2006.01) | |
| C04B 33/135 | (2006.01) | |
| C04B 35/19 | (2006.01) | |
| C04B 35/626 | (2006.01) | |

(52) U.S. Cl.
CPC .............. *G21F 9/302* (2013.01); *C04B 35/653* (2013.01); *G21F 9/30* (2013.01); *C04B 33/1324* (2013.01); *C04B 33/1328* (2013.01); *C04B 33/1352* (2013.01); *C04B 35/19* (2013.01); *C04B 35/6262* (2013.01); *C04B 2235/3201* (2013.01); *C04B 2235/3206* (2013.01); *C04B 2235/3208* (2013.01); *C04B 2235/3217* (2013.01); *C04B 2235/3232* (2013.01); *C04B 2235/3272* (2013.01); *C04B 2235/3409* (2013.01); *C04B 2235/3418* (2013.01); *C04B 2235/5436* (2013.01); *C04B 2235/77* (2013.01); *C04B 2235/80* (2013.01); *Y10S 588/901* (2013.01)
USPC ............................. 588/20; 588/412; 588/901

(58) Field of Classification Search
USPC ................................ 588/20, 19, 18, 412, 901
See application file for complete search history.

(56) References Cited

FOREIGN PATENT DOCUMENTS

| | | |
|---|---|---|
| JP | 06-109896 A | 4/1994 |
| JP | 06-138298 A | 5/1994 |
| KR | 10-0192128 B1 | 11/1995 |
| KR | 10-1090344 B1 | 3/2011 |

OTHER PUBLICATIONS

International Atomic Energy Agency; Feasibility of separation and utilization of cesium and strontium . . . ; Tech Report Series No. 356, IAEA, Vienna (1993) p. 34.
W. J., "Volatility of Some Potential High-Level Radioactive Waste Forms," Rad. Waste Mgmt., 1(2), 14T-169 (1980).
Y.S. Lee, et al; Uranium ingot casting method with uranium deposit in a Pyroprocessing; Journ. of Korean Radioactive Waste Society; vol. 8; No. 1; 2010; pp. 85-89.
Notice of Allowance dated May 20, 2014 of corresponding Korean Patent Application No. 10-2012-0118711.

*Primary Examiner* — Edward Johnson
(74) *Attorney, Agent, or Firm* — Lucas & Mercanti, LLP

(57) ABSTRACT

A method of preparing a simple ceramic ingot of a spent filter having radioactive cesium trapped therein, and a ceramic ingot of a spent filter having improved properties such as leach resistance, thermal stability, and cesium content are provided. The method includes grinding and mixing a spent filter having cesium trapped therein, adding a solidifying agent, and sintering the spent filter. The method of preparing a ceramic ingot of a spent filter can be useful in preparing the ceramic ingot of the spent filter from only the spent filter by means of simple grinding and sintering, and in preparing the ceramic ingot of the spent filter by adding a small amount of a solidifying agent. The ceramic ingot of the spent filter has a high density and improved thermal stability, and shows improved leach resistance since a leach rate of a radioactive material is remarkably low. Therefore, the spent filter having radioactive cesium trapped therein can be effectively used to prepare a stable ceramic ingot.

10 Claims, 3 Drawing Sheets

US 8,969,646 B2

CERAMIC INGOT OF SPENT FILTER HAVING TRAPPED RADIOACTIVE CESIUM AND METHOD OF PREPARING THE SAME

CROSS-REFERENCE TO RELATED APPLICATION

This application claims priority to and the benefit of Korean Patent Application No. 10-2012-0118711, filed 24 Oct. 2012, the disclosure of which is incorporated herein by reference in its entirety.

BACKGROUND

1. Field of the Invention

The present invention relates to a method of preparing a ceramic ingot of a spent filter by grinding and sintering a spent filter having trapped radioactive cesium.

2. Discussion of Related Art

In recent years, it has been reported that electric power currently produced by nuclear power generation accounts for approximately 40% of electric power production in Korea, and spent nuclear fuel formed from the nuclear power generation amounts to 850 tons every year. Pyroprocessing is emerging as an option for recycling such spent nuclear fuel. Pyroprocessing is technology of recovering nuclear fuel materials such as uranium (U) and transuranium (TRU) elements from spent nuclear fuel using an electrochemical method in a molten salt medium having a high temperature (500 to 650° C.). A high-temperature voloxidation process is accompanied with a pretreatment process of the pyroprocessing. In this case, a volatile nuclide (Kr, Xe, C-14, H-3, etc.) and a semi-volatile nuclide (Cs, Tc, I, etc.) are released. As a result, a demand for technology of treating a filter trapping the nuclides to prevent release of the nuclides to the facilities and environments and technology of preparing the nuclides into a stable solid-phase ingot so as to dispose of the filter has been emphasized.

In this regard, Korean Patent Nos. 0192128 and 1090344 disclose a technique for selectively separating and trapping cesium through a high-temperature chemical adsorption method using a solid medium including fly ash and silica at 40 to 65% by weight, alumina at 15 to 30% by weight, an iron oxide at 5 to 15% by weight, a molybdenum oxide at 1 to 15% by weight, a chromium oxide at 1 to 10% by weight, and a vanadium oxide at 1 to 10% by weight. In the prior-art patents, it was proposed that radiation and heat of the spent nuclear fuel may be reduced by selectively trapping cesium (Cs-137), which is a highly radioactive and high heat generation nuclide, and has a half-life of approximately 30 years, in stable phases of cesium aluminosilicate (pollucite ($CsAlSi_2O_6$), $CsAlSiO_4$, and $CsAlSi_5O_{12}$) using a ceramic filter made of an aluminosilicate component, thereby reducing an area required for disposal. Here, at least 99% of the cesium (Cs-137) is expected to volatilize during a high-temperature heat treatment process of pyroprocessing pretreatment.

Also, a vitrification method has often been used to dispose of a high level of radioactive waste. In this method, radioactive nuclides are trapped in a physicochemically hard glass structure, and solidified into a glass-solidified mass. Although the glass-solidified mass prepared thus has advantages in that it is adaptable to compositions and process parameters, and highly resistant to radioactivity, it has a problem of low leach resistance. According to the literature by W. J. Gray, 5.5%, 31% and 100% of cesium volatilizes at 1,000° C., 1,100° C. and 1,200° C., respectively, during this process. Therefore, there is a difficulty in a process of retrapping volatilized cesium (W. J., "Volatility of Some Potential High-Level Radioactive Waste Forms," Rad. Waste Mgmt., 1(2), 147-169 (1980)), and cesium may be included in a glass-solidified mass at a content of up to 15% by weight, and an increase in an added solidifying agent may result in an increase in an amount of waste.

In addition, when a glass-solidified mass is used in a gamma-ray irradiator, it is not effectively used in the field of industry to apply gamma rays due to low specific radioactivity (Ci/g) (International Atomic Energy Agency, Feasibility of Separation and Utilization of Cesium and Strontium from High Level Liquid Waste, Technical Report Series No. 356, IAEA, Vienna (1993)).

As described above, technology of trapping volatile cesium and technology of vitrifying a high level of radioactive waste are known in the related art, but have various problems. Therefore, there is a demand for a new method of preparing a filter into a solidified mass, wherein the filter serves to trap gas-phase radioactive waste formed from spent nuclear fuel during a high-temperature heat treatment process.

SUMMARY OF THE INVENTION

Therefore, the present invention is designed to solve the problems of the prior art. In this regard, the present inventors have conducted research to develop a technique for preparing a gas-phase radioactive waste, which is formed from spent nuclear fuel during a high-temperature heat treatment process, into a stable solidified mass, and found that the stable solidified mass may be prepared by sintering a spent filter having gas-phase cesium trapped therein, and adding a glass material as a solidifying agent. Therefore, the present invention is completed based on these facts.

Accordingly, it is an object of the present invention to provide a method of preparing a stable ceramic ingot showing excellent thermal stability, improved leach resistance, and high density. Here, the method includes grinding and sintering a spent filter and adding $Na_2O$, $K_2O$, $Fe_2O_3$, $TiO_2$, $MgO$, $CaO$ or $B_2O_3$ as a solidifying agent.

However, the problems to be solved according to the present invention are not limited to the above-described problems, and other problems which are not disclosed herein may be made apparent from the detailed description provided below by those skilled in the art.

One aspect of the present invention provides a method of preparing a ceramic ingot of a spent filter having radioactive cesium trapped therein. Here, the method includes:

a) grinding and mixing a spent filter having gas-phase cesium trapped therein;

b) primarily sintering the spent filter;

c) grinding the sintered spent filter; and d) secondarily sintering the ground filter powder obtained in operation (c) for 2 to 10 hours to prepare a ceramic ingot.

Another aspect of the present invention provides a ceramic ingot of a spent filter prepared using the method. Here, the ceramic ingot of the spent filter includes a spent filter at a content of 65 to 100% by weight.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
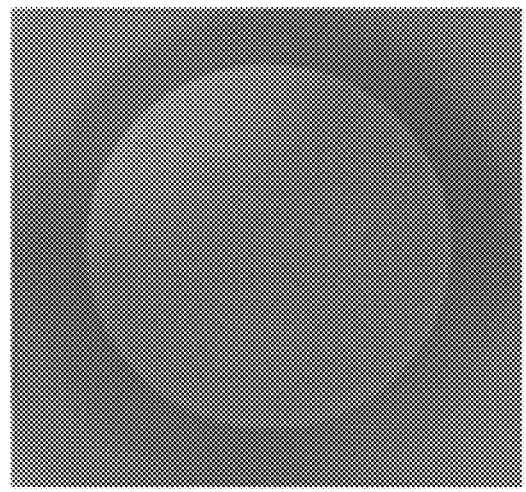
FIG. 1 is an image of ceramic ingot of a spent aluminosilicate filter obtained by grinding and mixing a spent aluminosilicate filter having cesium trapped therein at a content of 18% by weight using an aluminosilicate filter, primarily sintering the spent filter at 900° C., secondarily grinding and mixing the sintered spent filter, and sintering the ground spent filter at 1200° C.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

As described above, the present inventors prepared a ceramic ingot of a spent filter by grinding, mixing and sintering a spent filter having cesium trapped therein so as to develop a method of preparing spent filter trapped a radioactive gaseous cesium waste, which is volatilized from a spent nuclear fuel during a high-temperature heat treatment process, into a stable waste form.

As a result, it was confirmed that the ceramic ingot of the spent filter prepared by the method had excellent thermal stability and a high density and showed good leach resistance and high specific radioactivity. Therefore, the present invention was completed based on these facts.

In this regard, the present invention provides a method of preparing a ceramic ingot of a spent filter having radioactive cesium trapped therein. Here, the method includes:

a) grinding and mixing a spent filter having gas-phase cesium trapped therein;

b) primarily sintering the spent filter;

c) grinding the sintered spent filter; and d) secondarily sintering the ground filter powder obtained in operation (c) for 2 to 10 hours to prepare a ceramic ingot.

The term "ingot" used in the present invention refers to a kind of lump obtained by melting a material at a high temperature and solidifying the melted material in a east having a certain shape.

The term "filter" used in the present invention refers to a foam-type ceramic filter prepared by sintering an aluminosilicate material. In this case, the ceramic filter may be used to chemically trap gas-phase cesium at a high temperature (600 to 1200° C.). That is, the term "spent filter" used in the present invention means a filter in which target material, that is, cesium is already trapped. Therefore, the term "cesium spent filter" used in the present invention means a filter with trapped radioactive cesium in a gas phase.

The term "sintering" used in the present invention means that powders are heated so that the powders can be strongly compacted and solidified. In the present invention, a sintering process may be performed using a sintering furnace, a plasticizing furnace, a heating furnace, or a calcining furnace. Preferably, a sintering furnace used in Examples of the present invention may be used herein, but the present invention is not limited thereto. Any kinds of furnaces may be used without limitation as long as they can solidify a powder obtained by grinding a spent filter.

Hereinafter, respective operations of the method according to the present invention will be described in further detail.

In operation (a) of the method according to the present invention, a spent filter having cesium trapped therein may be a fly ash ceramic filter or an aluminosilicate ceramic filter, but filters that may trap volatile cesium may be used without limitation. The spent filter according to the present invention is used to trap gas-phase cesium formed during a high-temperature voloxidation process, which is one of pretreatment processes of pyroprocessing, in phases of cesium aluminosilicate ($CsAlSi_2O_6$, $CsAlSi_5O_{12}$, and $CsAlSiO_4$). Here, the gas-phase cesium is trapped at a content of 3 to 50% by weight. The spent filter having cesium trapped therein is ground and mixed so that the spent filter has a particle size of 10 to 60 μm. The grinding is preferably performed using a roll mill, a hammer mill, or a disk mill. A disk mill used in Examples of the present invention is most preferred, but the present invention is not limited thereto. In the present invention, a stirrer may be used for uniform mixing, but any kinds of devices used for uniform mixing may be used without limitation.

Operation (b) of the method according to the present invention is an operation of primarily sintering the ground spent filter at 500 to 1,500° C., preferably 800 to 1000° C. Upon trapping the gas-phase cesium, cesium trapping quantity of the fly ash filter is in the range of 0.001 to 0.14 g-Cs/g-filter and is decreased with an increase in filter depth. When saturated cesium in a high-concentration region of the spent filter is formed cesium silicate glass by means of primarily sintering, aluminosilicate components in a low-concentration region of the spent filter are recycled and converted into stable phases of cesium aluminosilicate. ($CsAlSi_2O_6$, $CsAlSi_5O_{12}$, and/or $CsAlSiO_4$) so as to have a uniform content of cesium.

Operation (c) of the method according to the present invention is an operation of grinding and mixing the primarily sintered spent filter so that the spent filter has a particle size of 10 to 60 μm. The grinding and mixing of the primarily sintered spent filter may be performed again to facilitate sintering of the ceramic ingot of the spent filter according to the present invention.

Operation (d) of the method according to the present invention is an operation of secondarily sintering the ground and mixed spent filter in an atmospheric environment to prepare a ceramic ingot of a spent filter. The secondary sintering is preferably performed at a heating rate of 3 to 10° C./min and a temperature of 500° C. to 1,800° C., preferably 900 to 1,800° C., for 3 to 6 hours, but the present invention is not limited thereto. Durability of the ceramic ingot may be strengthened by performing the sintering twice.

Also, the method of preparing a ceramic ingot of a spent filter having radioactive cesium trapped therein according to the present invention may further include adding a solidifying agent before the secondary sintering. Here, the solidifying agent may be added to decrease a melting point and improve physical properties. Preferably, $Na_2O$, $K_2O$, $Fe_2O_3$, $TiO_2$, MgO, CaO, or $B_2O_3$ may be used as the solidifying agent, but the present invention is not limited thereto. The solidifying agent may be mixed in the ground spent filter of operation (c) at a content of 0 to 35% by weight, preferably at a content of 1 to 15% by weight. Most preferably, $Na_2O$, $K_2O$ and $B_2O_3$ may be used at contents of 1 to 10% by weight, 1 to 10% by weight, and 1 to 15% by weight, respectively, but the present invention is not limited thereto. When the solidifying agent is present in this content range, a proper sintering temperature is maintained, durability of the ceramic ingot is lowered, and leaching of a radioactive material decreases.

Also, the present invention provides a ceramic ingot of a spent filter prepared using the above-described method. Here, the ceramic ingot of the spent filter includes the spent filter at 65 to 100% by weight.

When the solidifying agent is added, the spent filter and the solidifying agent are preferably present at contents of 65 to 100% by weight and 0 to 35% by weight, respectively. When a content of the spent filter is less than 65% by weight, the ceramic ingot of the spent filter is not easily formed due to a low content of radioactive cesium oxide. On the other hand, when a content of the solidifying agent exceeds 35% by weight, an unstable solidified mass may be formed.

Since the ceramic ingot of the spent filter according to the present invention has a leaching rate of $4.0 \times 10$ g/m²·day, it is confirmed that the ceramic ingot of the spent filter exhibits very excellent leach resistance due to a very low leaching rate (see Example 1 and Comparative Example 1).

Also, the ceramic ingot of the spent filter prepared by the method according to the present invention has a cesium volatilization rate of approximately 5% or less, high thermal stability and a very low cesium volatilization rate, as measured at a sintering temperature of 1,500° C., and thus exhibits improved leach resistance (see Example 5).

The term "specific radioactivity" used in the present invention refers to a level of radioactivity obtained by dividing a radioactive intensity of a unit weight of a certain material, that is, a radioactive intensity of a material including a radioactive isotope, by a weight of the material. The ceramic ingot of the spent filter prepared by the method according to the present invention has a very high specific radioactivity of 18 Ci/g when a cesium content is up to 50% by weight. Since gamma rays may be emitted from the ceramic ingot of the spent filter in this condition, the ceramic ingot of the spent filter is applicable to a gamma-ray irradiator for the purpose of use for food irradiation or industrial waste water treatment (see Example 6).

Hereinafter, preferred Examples are provided to aid in understanding the present invention. However, it should be understood that detailed description provided herein is merely intended to provide a better understanding of the present invention, but is not intended to limit the scope of the present invention.

Example 1

Analysis of Leaching Characteristics of Ceramic Ingot of Spent Filter having Radioactive Cesium Trapped Therein Using Aluminosilicate Filter By using an aluminosilicate filter, a spent filter having, radioactive cesium trapped therein at a content of 18% by weight was ground into powder having a particle size of 10 to 60 μm using a disk mill, and mixed using a powder mixing machine. Thereafter, the mixed powder of the spent filter was sintered at 1,000° C. Then, the sintered spent filter was ground into powder having a particle size of 10 to 60 μm using a disk mill, and then mixed using a powder mixing machine. Finally, 50 g of the powder was put into alumina melting pots, heated to 1,000° C., 1,100° C., 1,200° C., 1,300° C., and 1,500° C. at a rate of 10° C./min under an atmospheric environment, and sintered for 3 hours to prepare a ceramic ingot of the spent filter (see FIG. 1).

To analyze leaching characteristics of the prepared ceramic ingot of the spent filter, a leaching rate was calculated from each solidified mass. A leaching experiment was performed by grinding the ceramic ingot of the spent filter and recovering the powder of the spent filter through a sieve with 100 meshes or less. The recovered powder was dipped into distilled water, and reacted at 90° C. for 7 days, and a content of cesium present in the leachate was analyzed to calculate a leaching rate. The results are listed in the following Table 1.

TABLE 1

| Cs content in solidified mass (% by weight) | Sintering temperature (° C.) | Leached nuclide (g/m² · day) | | | Density of solidified mass (g/cm³) |
|---|---|---|---|---|---|
| | | Cs | Si | Al | |
| 18 | 1,000 | $3.1 \times 10^{-3}$ | $2.1 \times 10^{-1}$ | $1.4 \times 10^{-4}$ | 1.8 |
| | 1,100 | $1.8 \times 10^{-3}$ | $1.1 \times 10^{-1}$ | $1.4 \times 10^{-4}$ | 2.4 |
| | 1,200 | $7.0 \times 10^{-4}$ | $4.6 \times 10^{-2}$ | $1.4 \times 10^{-4}$ | 2.5 |
| | 1,300 | $8.0 \times 10^{-4}$ | $5.7 \times 10^{-2}$ | $1.4 \times 10^{-4}$ | 2.4 |
| | 1,500 | $4.0 \times 10^{-4}$ | $3.3 \times 10^{-2}$ | $1.4 \times 10^{-4}$ | 2.5 |

As listed in Table 1, it was revealed that the cesium leaching rates of the prepared ceramic ingot of the spent filter were $3.1 \times 10^{-3}$ g/(m²·day), $1.8 \times 10^{-3}$ g/(m²·day), $7.0 \times 10^{-4}$ g/(m²·day), $8.0 \times 10^{-4}$ g/(m²·day), and $4.0 \times 10^{-4}$ g/(m²·day) at sintering temperatures of 1,000° C., 1,100° C., 1,200° C., 1,300° C., and 1,500° C., respectively. From these results, it was confirmed that the ceramic ingot of the spent filter prepared from the aluminosilicate filter had a very low cesium leaching rate.

Example 2

Figure 2:
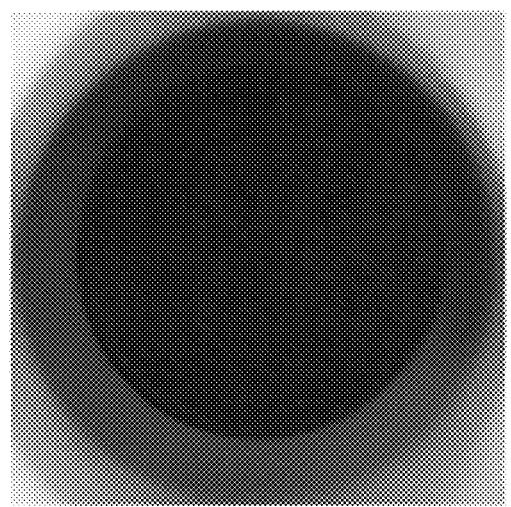
FIG. 2 is an image of ceramic ingot of a spent fly ash filter obtained by grinding and mixing a spent fly ash filter having cesium trapped therein at a content of 12.3% by weight using a coal fly ash filter according to the present invention, primarily sintering the spent filter at 900° C., secondarily grinding and mixing the sintered spent filter, and sintering the ground spent filter at 1200° C.
Figure 3:
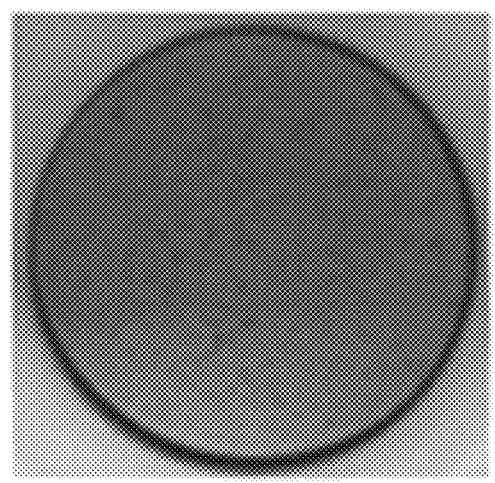
FIG. 3 is an image of ceramic ingot of a spent filter obtained by sintering a mixture of spent filter and $Na_2O$ at a weight ratio of 90%:10% at 1200° C. for 3 hours.

Analysis of Leaching Characteristics of Ceramic Ingot of Spent Filter having Radioactive Cesium Trapped Therein Using Fly Ash Filter By using a fly ash filter, a spent filter having cesium trapped therein at a content of 12.3% by weight was ground into powder having a particle size of 10 to 60 µm using a disk mill, and mixed using a powder mixing machine. Thereafter, the mixed powder of the spent filter was sintered at 1,000° C., Then, the sintered spent filter was ground into powder having a particle size of 10 to 60 µm using a disk mill, and then mixed using a powder mixing machine. Finally, 50 g of the powder was put into alumina melting pots, heated to 1,200° C., 1,300° C., and 1,500° C. at a rate of 10° C./min under an atmospheric environment, and sintered for 3 hours to prepare a ceramic ingot of a spent fly ash filter including radioactive cesium (see FIG. 2). To analyze leaching characteristics of the prepared ceramic ingot of the spent filter, a leaching experiment was performed by grinding the ceramic ingot of the spent filter and recovering the powder of the spent filter through a sieve with 100 meshes or less. The recovered powder was dipped into distilled water, and reacted at 90° C. for 7 days, and is content of cesium present in the leachate was analyzed to calculate a leaching rate from each ceramic ingot of the spent filter. The results are listed in the following Table 2.

TABLE 2

| Cs content in solidified mass (% by weight) | Sintering temperature (° C.) | Leached nuclide (g/m² · day) | | | Density of solidified mass (g/cm³) |
|---|---|---|---|---|---|
| | | Cs | Si | Al | |
| 12.3 | 1200 | 6.0 × 10⁻⁴ | 3.6 × 10⁻² | 1.4 × 10⁻⁴ | 1.4 |
| | 1300 | 3.0 × 10⁻⁴ | 5.1 × 10⁻² | 1.4 × 10⁻⁴ | 1.5 |
| | 1500 | 3.0 × 10⁻⁴ | 3.0 × 10⁻² | 1.4 × 10⁻⁴ | 2.7 |

As listed in Table 2, it was revealed that the cesium leaching rates of the prepared ceramic ingot of the spent filter were $6.0 \times 10^{-4}$ g/(m²·day), $3.0 \times 10^{-4}$ g/(m²·day), and $3.0 \times 10^{-4}$ g/(m²·day) at sintering temperatures of 1,200° C., 1,300° C., and 1,500° C., respectively. From these results, it was confirmed that the ceramic ingot of the spent filter having trapped radioactive cesium had a very low radioactive cesium leaching rate even when the ceramic ingot of the spent filter was prepared from the fly ash filter.

Example 3

Preparation and Analysis of Leaching Characteristics of Ceramic Ingot of Spent Filter Obtained by Adding $Na_2O$ to Spent Filter having Radioactive Cesium Trapped Therein Using Fly Ash Filter By using a fly ash filter, a spent filter having cesium trapped therein at a content of 18% by weight was ground into powder having a particle size of 10 to 60 µm using a disk mill, and mixed using a powder mixing machine. Thereafter, the mixed powder of the spent filter was sintered at 1,000° C. Then, the sintered spent filter was ground into powder having a particle size of 10 to 60 µm using a disk mill, and then mixed using a powder mixing machine. Finally, the spent filter and $Na_2O$ were mixed at a weight ratio of 90%:10%, and 50 g of the resulting mixture was put into alumina melting pots, and sintered at 1,200° C. for 3 hours at a heating rate of 10° C. min under an atmospheric environment to prepare a ceramic ingot including, radioactive cesium oxide and having a density of 2.3 g/cm³. Also, to analyze leaching characteristics the ceramic ingot of the spent filter, the ceramic ingot of the spent filter was ground, and the ground powder having a size of 100 meshes or less was recovered. The recovered powder was dipped into distilled water, and reacted at 90° C. for 7 days. In this case, it was revealed that the cesium leaching rate was $6.0 \times 10^{-4}$ g/m²·day, and thus a leak rate of a radioactive material was very low.

Example 4

Figure 4:
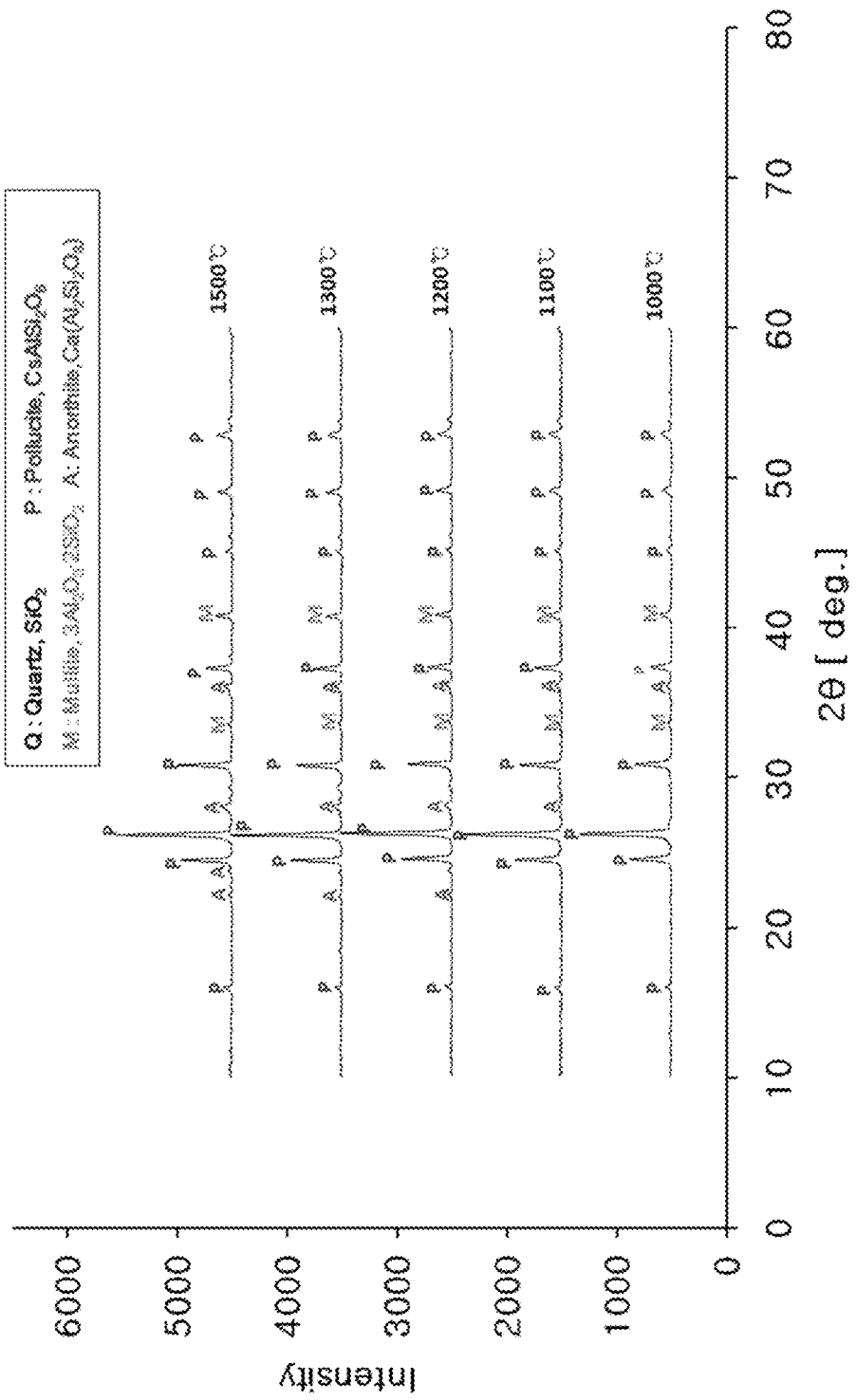
FIG. 4 is a graph showing the results of X-ray diffraction (XRD) analysis of a ceramic ingot of a spent filter (Example 4) prepared from a fly ash filter according to the present invention by sintering a spent filter having radioactive cesium trapped therein.

Phase Analysis of Ceramic Ingot of Spent Fly Ash Filter having Radioactive Cesium Trapped Therein To analyze a phase of the ceramic ingot of the spent filter prepared by sintering a spent filter, in which cesium was trapped at a content of 24% by weight, at 1,200 to 1,500° C. using a fly ash filter, an X-ray diffraction analysis (XRD, Simens, D-5000) was performed on the ceramic ingot of the spent filter. As a result, it was confirmed that cesium in the solidified mass was present in the form of stable pollucite ($CsAlSi_2O_6$), depending on positions of main peaks (see FIG. 4).

Example 5

Phase Analysis of Ceramic Ingot of Spent Aluminosilicate Filter having Radioactive Cesium Trapped Therein To analyze a phase of the ceramic ingot of the spent filter prepared by sintering a spent filter, in which cesium was trapped at a content of 24% by weight, at 1,200 to 1,500° C. using an aluminosilicate filter, an X-ray diffraction analysis (XRD, Simens, D-5000) was performed on the ceramic ingot of the spent filter. As a result, it was confirmed that cesium in the solidified mass was present in the form of $CsAlSi_5O_2$ or pollucite ($CsAlSi_2O_6$), depending on positions of main peaks (see Table 3).

TABLE 3

| Cesium content | Temperature used to prepare solidified mass | | | | |
|---|---|---|---|---|---|
| | 1,000° C. | 1,100° C. | 1,200° C. | 1,300° C. | 1,500° C. |
| 0.06 g-Cs/g-filter | Quartz Corundum, $CsAlSi_5O_{12}$ | Quartz Corundum $CsAlSi_5O_{12}$ | Quartz, $SiO_2$ Cristobalite Corundum $CsAlSi_5O_{12}$ | Cristobalite Corundum $CsAlSi_5O_{12}$ | Cristobalite Corundum |

TABLE 3-continued

| Cesium content | Temperature used to prepare solidified mass | | | | |
|---|---|---|---|---|---|
| | 1,000° C. | 1,100° C. | 1,200° C. | 1,300° C. | 1,500° C. |
| 0.14 g-Cs/g-filter | Quartz Corundum, $CsAlSi_5O_{12}$ | Quartz Cristobalite Corundum $CsAlSi_5O_{12}$ | Quartz Cristobalite Corundum $CsAlSi_5O_{12}$ | Cristobalite Corundum $CsAlSi_5O_{12}$ | Cristobalite Corundum |
| 0.22 g-Cs/g-filter | Quartz Corundum $CsAlSi_5O_{12}$ | Quartz Cristobalite Corundum $CsAlSi_5O_{12}$ | Cristobalite Corundum $CsAlSi_5O_{12}$ | Cristobalite Corundum $CsAlSi_5O_{12}$ | Cristobalite Corundum Pollucite $CsAlSi_5O_{12}$ |
| 0.32 g-Cs/g-filter | Corundum $CsAlSi_5O_{12}$ | Corundum $CsAlSi_5O_{12}$ | Cristobalite Corundum $CsAlSi_5O_{12}$ | Cristobalite Corundum, $CsAlSi_5O_{12}$ | Cristobalite Corundum Pollucite $CsAlSi_5O_{12}$ |

Example 6

Specific Radioactivity According to Change in Cesium Content of Ceramic Ingot of Spent Filter having Radioactive Cesium Trapped Therein Using Fly Ash Filter A nuclear fuel (initial concentration: 4.5% by weight, degree of combustion: 55,000 MWd/tU, cooling period: 10 years) used in a pressurized water reactor, which was a reference nuclear fuel used in a pyroprocessing process, was selected to calculate a specific radioactivity using an ORIGEN-automatic rapid processing (ARP) code when cesium contents in the ceramic ingot of the spent filter were 12% by weight, 24% by weight, and 50% by weight. The results are listed in the following Table 4.

TABLE 4

| Cesium content (% by weight) | Specific radioactivity (Ci/g) |
|---|---|
| 12 | 4.3 |
| 24 | 8.6 |
| 50 | 18 |

As described above, it was revealed that the ceramic ingot of the spent filter had high specific radioactivities of 4.3 Ci/g, 8.6 Ci/g and 18 Ci/g when measured at cesium contents of 12% by weight, 24% by weight and 50% by weight, respectively.

Comparative Example 1

Analyses of Leaching Characteristics of Ceramic Ingot of Spent Filter and Glass-Solidified Mass, Each having Radioactive Cesium Trapped Therein, Using Aluminosilicate Filter To analyze leaching characteristics of the ceramic ingot of the spent filter and the glass-solidified mass, each of which had radioactive cesium trapped therein, using an aluminosilicate filter, a leaching rate was calculated from each sample.

The glass-solidified mass of Comparative Example 1 was prepared using a typical method of preparing a borosilicate glass-solidified mass. By using an aluminosilicate filter, a spent filter having radioactive cesium trapped therein at a content of 18% by weight was ground into powder having a particle size of 10 to 60 μm using a disk mill, and mixed using a powder mixing machine. Thereafter, the spent filter, $B_2O_5$ and $Na_2O$ were mixed at a weight ratio of 50%:20%:30%, and 50 g of the resulting mixture was put into alumina melting pots, and sintered at 1,200° C. for 3 hours at heating rate of 10° C./min under an atmospheric environment to prepare a glass-solidified mass having radioactive cesium trapped therein.

The prepared borosilicate glass-solidified mass was ground using a disk milk and the ground powder having a size of 100 meshes or less was recovered. The recovered powder was dipped into distilled water, and reacted at 90° C., for 7 days. Then, a content of cesium present in the leachate was analyzed to calculate a leaching rate.

Also, the leaching rates (see Table 1) of the ceramic ingots prepared after the spent filter having radioactive cesium trapped therein was sintered at 1,200° C. for 3 hours using the aluminosilicate filter were compared.

As a result, it was revealed that the ceramic ingot of the spent filter had a cesium leaching rate of approximately 7.0×10 $g/m^2$·day, and the glass-solidified mass had a cesium leaching rate of approximately $6 \times 10^{-2}$ $g/m^2$·day. Therefore, it was confirmed that the ceramic ingot of the spent filter prepared by the method according to the present invention had a remarkably low radioactive material leak rate since the leaching rate of the glass-solidified mass was 86 times higher than that of the ceramic ingot of the spent filter.

According to the present invention, the ceramic ingot of the spent filter may be readily prepared in a stable solid phase by grinding the spent filter and sintering the spent filter at a temperature of 900 to 1,800° C., and thus the method of preparing a ceramic ingot using a spent filter having radioactive cesium trapped therein, which is released in a high-temperature voloxidation process which is one of pretreatment processes of pyroprocessing, can be useful in facilitating disposal of the spent filter having cesium trapped therein.

Also, the ceramic ingot of the spent filter prepared by the method shows excellent thermal stability and enhanced density, and has advantages in that a large amount of cesium may be included by adding a relatively smaller amount of a solidifying agent than in the conventional technology, and a leach rate of radioactive cesium is very low. Thus, the ceramic ingot of the spent filter can show improved leach resistance.

In addition, the present invention may solve the problem that cesium should be retrapped since cesium in a vitrified solidified mass is easily volatilized when a conventional vitrification method is used, and provide a ceramic ingot in which a volatilization rate of cesium is reduced to approximately 5% or less. Compared with the fact that a cesium content is up to 15% by weight when the conventional vitrification method is used, the ceramic ingot of the spent filter according to the present invention has a remarkably high cesium content of up to 50% by weight, and also shows high specific radioactivity (Ci/g). Therefore, the ceramic ingot of the spent filter according to the present invention may be effectively used in a gamma-ray irradiator for gamma-radioactive analysis when the ceramic ingot of the spent filter is recycled with a cesium isotope.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of preparing a ceramic ingot of a spent filter having radioactive cesium trapped therein, the method comprising:
   a) grinding and mixing a spent filter having gas-phase cesium trapped therein;
   b) primarily sintering the spent filter;
   c) grinding the sintered spent filter; and
   d) secondarily sintering the ground filter powder obtained in operation (c) for 2 to 10 hours to prepare a ceramic ingot.

2. The method according to claim 1, wherein the spent filter in operation (a) has cesium trapped therein at content of 3% to 50% by weight.

3. The method according to claim 1, wherein the primary sintering of operation (b) is performed at a temperature of 500 to 1,500° C.

4. The method according to claim 1, further comprising adding a solidifying agent before the secondary sintering.

5. The method according to claim 4, wherein the solidifying agent is at least one selected from the group consisting of $Na_2O$, $K_2O$, $Fe_2O_3$, $TiO_2$, MgO, CaO and $B_2O_3$.

6. The method according to claim 4, wherein the solidifying agent is added to the spent filter at a content of 0 to 35% by weight.

7. The method according to claim 1, wherein the secondary sintering of operation (d) is performed at a temperature of 900 to 1,800° C.

8. A ceramic ingot of a spent filter prepared using the method according to claim 1, comprising a spent filter at as content of 65 to 100% by weight.

9. The ceramic ingot of the spent filter according to claim 8, wherein the ceramic ingot is in a $CsAlSi_2O_6$, $CsAlSi_5O_{12}$ or $CsAlSiO_4$ phase.

10. The ceramic ingot of the spent filter according to claim 8, wherein the ceramic ingot is applicable to a gamma-ray irradiator for the purpose of use for food irradiation or industrial waste water treatment.

* * * * *